Nov. 15, 1927.

T. C. KASEBERG 1,649,411

CAR WHEEL BORING MACHINE

Filed Dec. 31, 1925   4 Sheets-Sheet 1

INVENTOR
Theodore C. Kaseberg
BY
ATTORNEY

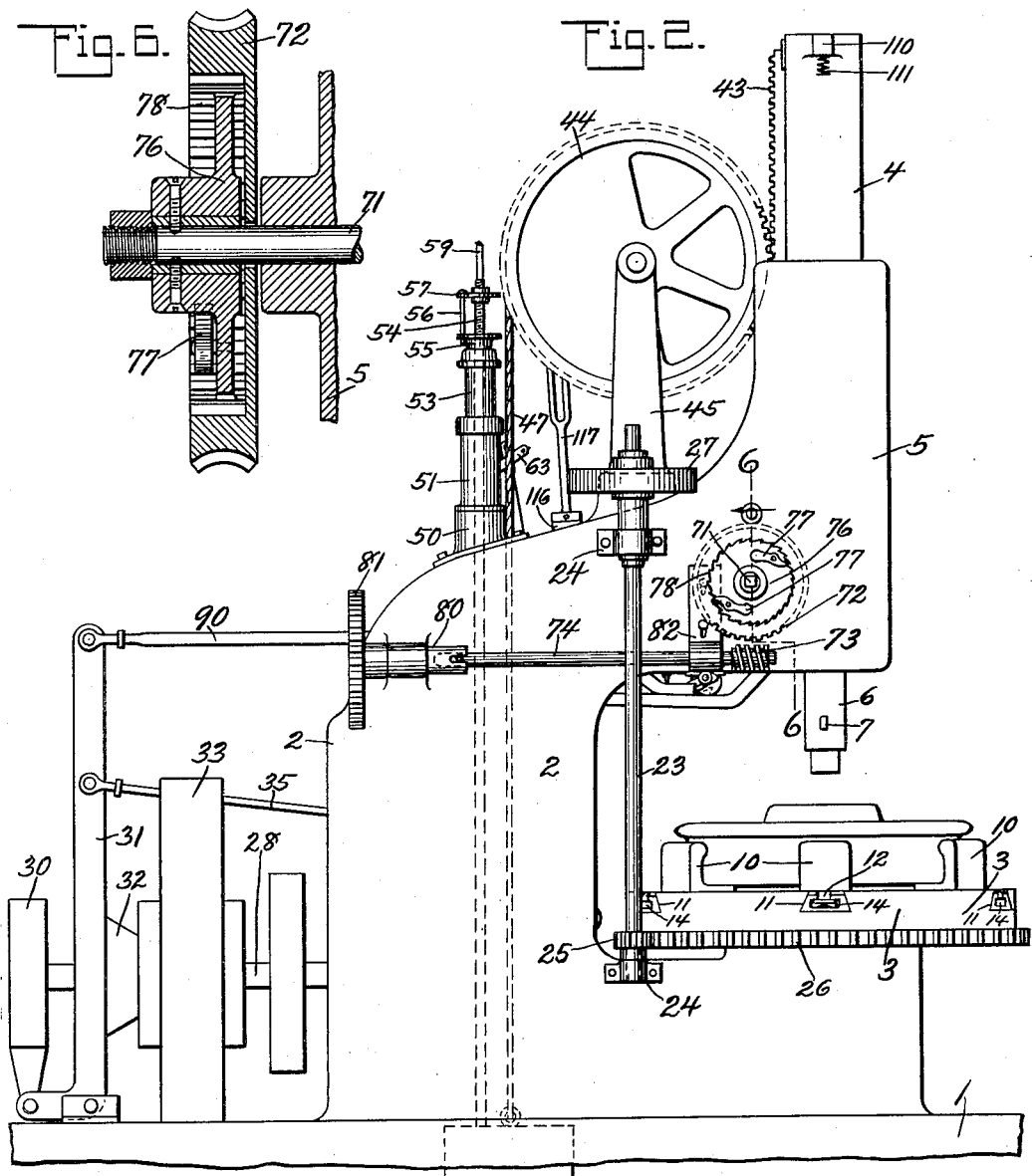

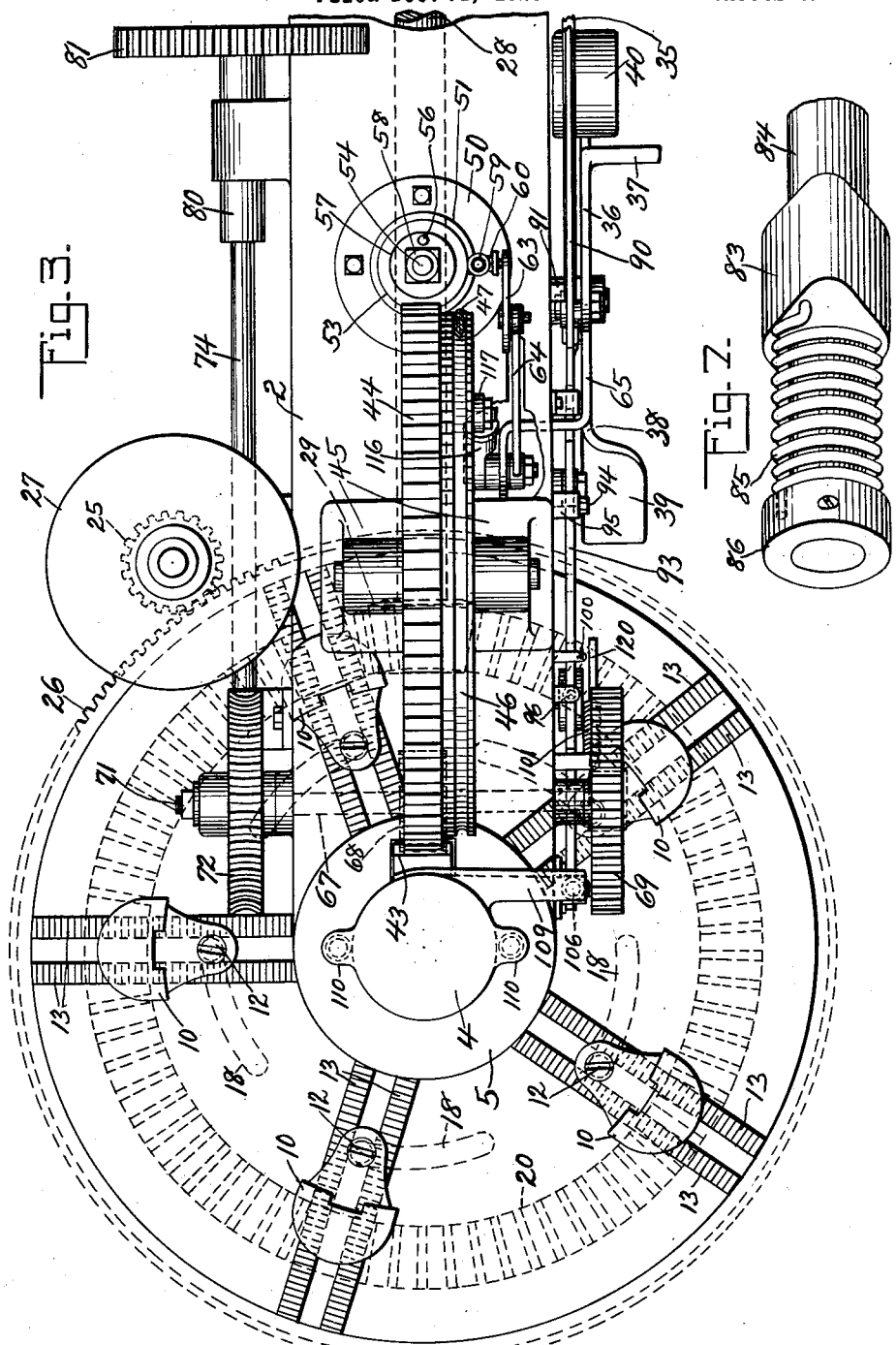

Nov. 15, 1927.  
T. C. KASEBERG  
1,649,411  
CAR WHEEL BORING MACHINE  
Filed Dec. 31, 1925  4 Sheets-Sheet 4
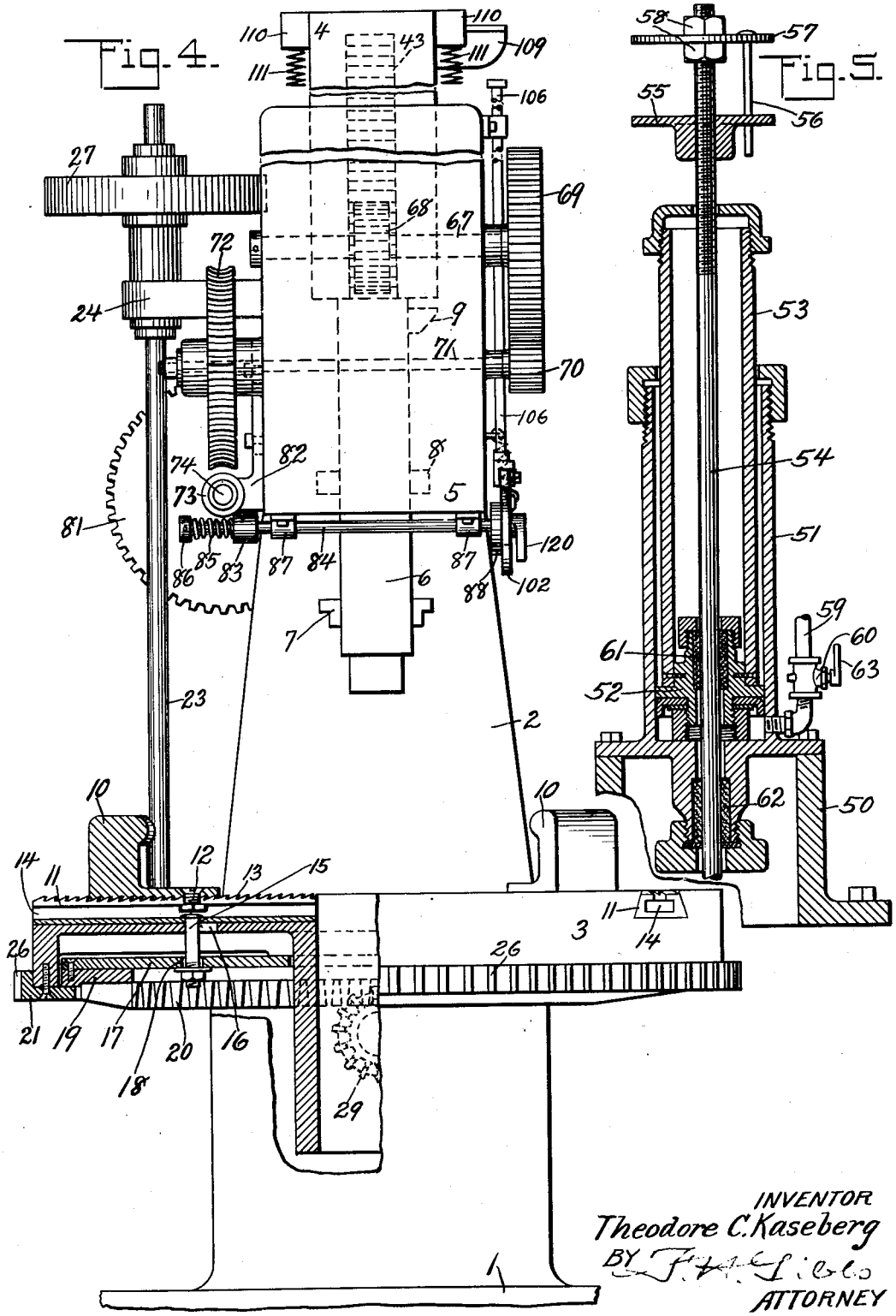
INVENTOR  
Theodore C. Kaseberg  
BY  
ATTORNEY Patented Nov. 15, 1927.

1,649,411

UNITED STATES PATENT OFFICE.

THEODORE C. KASEBERG, OF GRANITE CITY, ILLINOIS, ASSIGNOR TO AMERICAN CAR AND FOUNDRY COMPANY, OF NEW YORK, N. Y., A CORPORATION OF NEW JERSEY.

CAR-WHEEL-BORING MACHINE.

Application filed December 31, 1925. Serial No. 78,652.

My invention relates to machine tools and particularly to machines for boring the axle holes in car wheels.

The so-called car-wheel boring machine is used to roughly bore, to finish and to chamfer the axle hole in a car wheel by one operation. The car wheel is clamped on a rotatable work table and is engaged by the cutting tools carried by a ram. The roughing, finishing, and chamfering tools are mounted in spaced relation on the tool spindle carried by the ram so as to successively engage the work on the rotating table during the feeding movement of the ram.

One object of my invention is to provide a car-wheel boring machine that shall have a rapid traverse mechanism and a relatively slow power feeding mechanism for operating the tool carrying ram and that shall have mechanism for automatically controlling the traverse and the feed mechanisms upon starting the operation of the machine.

Another object of my invention is to provide a car-wheel boring machine that shall have automatic means for centering and clamping the work piece or wheel on the table upon starting the machine to rotate the table and for unclamping the wheel from the table upon stopping the machine to stop the rotation of the work table.

In the embodiment hereinafter shown and described, my invention affords a boring machine which is completely automatic in operation, from the moment the work is placed on the revolving support and the controller thrown "on" until the boring is completed, the tools returned to initial position ready for another operation, and the work released for removal from the machine. Various parts and mechanism of the machine are also in themselves new and useful.

In the accompanying drawings;

Figure 1 is a front elevational view of a car-wheel boring machine constructed in accordance with my invention;

Figure 2 is a back elevational view of the boring machine shown in Figure 1;

Figure 3 is a plan view of the boring machine;

Figure 4 is an end view of the boring machine, with a portion of the work carrying table in section;

Figure 5 is a sectional view of the fluid cylinder for effecting rapid traverse movement of the tool carrying ram;

Figure 6 is a sectional view along the line 6—6 of Figure 2;

Figure 7 is an enlarged view of the feed cam and the shaft for operating it; and Figure 8 is an enlarged view of a portion of the mechanism for controlling the rapid traverse mechanism and the slow feed mechanism.

Referring to the drawings, a boring machine is shown comprising a base 1 having an upright 2 projecting therefrom. Preferably the upright 2 is formed integral with the base 1. A rotatable work carrying table 3 is mounted on the base 1 and a tool carrying ram 4 is mounted in a head portion 5 of the upright 2. The ram 4 is held against rotative movement but is free to move in a vertical direction. A tool spindle 6 having a roughing tool 7, a finishing tool 8 and a chamfering tool 9, is carried by the ram.

The rotary work support or table 3 is driven through connections including a shaft 28 with a brake 30, and also a clutch 32 for connecting said shaft to a suitable source of power (not shown) through gearing indicated at 33. The brake 30 and the clutch 32 are controlled by a bell crank lever 31, which is connected to a revoluble controller 34 by a link rod 35. The rapid traverse or feed of the tool ram 4 is effected by a fluid pressure motor indicated at 51, and is controlled by a valve 60 whose operating arm 63 is connected by a link rod 64 to the controller 34. The slower working feed of the ram is effected mechanically, through a rack and gear connection 43, 69. This mechanical feed is also controlled by the controller 34, by virtue of connections from the lever 31 including a rod 90. This rod 90 not only connects and disconnects the mechanical feed to and from a source of power represented by the shaft 74 (Fig. 2), but also operates a trip latch mechanism (hereinafter described) for holding the controller 34 in "on" position during the downward working stroke of the ram 4. As hereinafter explained, the connections of the feeds to the tool ram 4 are such that the ram 4 can be fed by the pressure feed even when the slower mechanical feed is in operation. At the conclusion of the downward stroke of the ram 4, the controller latch is tripped, the mechanical feed is thrown out of operation, and the controller 34 is returned from "on" position, which causes stopping of the rotary table 3 and of the pressure feed, as well as return of the tool ram 4 to initial position, ready for another operation. This is effected (as hereinafter described) through a rod 106 actuated by a stop 109 on the ram 4.

Convergently and divergently movable clamping jaws 10 are provided for centering and also for clamping the car wheel to the work table 3. Each of the jaws 10 is secured to a clamping slide 11 by means of a bolt 12. Preferably suitable teeth 13 are provided on the slides 11 and also on the jaws 10 for preventing movement of the jaws with respect to the slides when the jaws have been set in position upon the slides. The bolts 12 project into T-slots 14 formed in the slides 11. Also, cam actuated bolts 15 project into the T-slots 14, for connecting the slides 11 to a cam plate 17 beneath the table. The slides 11 are mounted in radial slots or grooves formed in the top of the table 3 and are moved in a radial direction in a manner to be hereinafter set forth for clamping and unclamping the car wheel. The slide bolts or studs 15 extend down through radial slots 16 in the table 3, as shown in Fig. 4, and through cam ways or slots 18 in the plate 17, as shown in Fig. 3 of the drawings. The cam plate 17 is secured to a ring 19 having bevelled gear teeth 20 formed on the lower surface thereof as shown in Fig. 4 of the drawings. The ring 19 and the cam plate 17 rest and are supported on an inward projecting ring 21 that is detachably secured to a marginal depending flange of the table 3 by screws; but the structure comprising the ring 19 and cam plate 17 is free to rotate relative to the table and the ring 21.

Rotation of the ring 19 and the cam plate 17 relative to the table 3 in one direction will radially advance the jaws 10 to center and clamp the car wheel in position. Rotation of the cam plate 17 with respect to the work table in an opposite direction will retract the jaws 10 and unclamp the work from the table. The work table is rotated by power supplied through the ring 19 and the plate 17 and suitable means comprising an inertia mechanism is provided for delaying the rotation of the table upon starting the rotation of the ring 19 and the plate 17. The lag produced in the rotation of the table 3 with respect to the rotation of the cam plate 17 causes automatic operation of the slides 11 to clamp the work in position. In a like manner the slides 11 are automatically operated to unclamp the work by virtue of a lag between the stopping of the rotation of the plate 17 and the stopping of the rotation of the work table 3.

The inertia mechanism for providing a lag in the operation of the work table with respect to the cam plate 17 comprises a shaft 23 which is rotatably supported in brackets 24 attached to the base and the upright of the machine. A pinion 25, which is secured near the lower end of the shaft 23, meshes with gear teeth 26 which are formed on the ring 21. Near the upper end of the shaft 23 a fly wheel or weight 27 is provided for adding inertia to the movements of the work carrying table. The weight 27 assures a lag in the rotation of the table 3 when the cam plate 17 starts to rotate and exerts a force tending to continue the rotation of the work table 3 when the rotation of the cam plate 17 is stopped.

A power shaft 28 drives the work carrying table 3 through a bevelled pinion 29 secured near one end of the shaft 28 and meshing with the bevelled teeth 20 on the ring 19. A brake 30, controlled by a bell crank lever 31, is provided for the shaft 28. A clutch 32, also controlled by the bell crank lever 31, serves for connecting the shaft 28 to a source of power (not shown) through suitable gearing contained within the casing 33. The bell crank lever 31 is pivotally mounted on the base of the machine as shown in Fig. 1 of the drawings.

The bell crank lever 31 is operated by means of a control lever 34 which is pivotally mounted on the upright 2. The bell crank lever 31 is connected to the control lever 34 by means of a link 35. The lever 34 is provided with an arm 36 having a hand grasp 37 thereon and with an arm 38 having a foot tread 39. A weight 40 on an arm 41 of the control lever 34 exerts a force tending to hold the control lever in released or "off" position.

The ram 4 has a rack 43 secured to it which meshes with the teeth on a gear wheel 44. The gear 44 is rotatably mounted on bracket 45, which projects from the upright 2, and is provided with a hub portion having a groove 46 formed therein. (Fig. 3). A flexible cable 47, which may be a rope or a chain, is mounted in the groove 46 and has one end directly connected to the gear 44. A weight 48 is secured to the opposite end of the cable 47 for exerting a force on the gear 44 tending to raise the ram 4. Preferably, the weight 48 is heavier than the ram 4, so as to bias the ram to tend to rise and to hold the ram in elevated position when the machine is not in operation.

A rapid traverse mechanism is provided for raising the weight 48 in order to rapidly move the cutting tools carried by the ram into operative position with respect to the work. The rapid traverse mechanism (shown in section in Fig. 5) has a base 50 which is secured to the upright 2 and carries a fluid cylinder 51. A plunger piston 52 is provided in the cylinder 51, including a plunger shell 53 secured to the piston 52. A rod 54 secured to the weight 48 extends up through the base 50 and the plunger 52, 53, as best shown in Fig. 5 of the drawings. An adjustable nut 55 is secured to the rod 54 in position to be engaged by the cylinder 53 for the purpose of raising the weight 48. The nut 55 is held securely in any adjusted position by means of a pin 56 which is carried by a plate 57 fixed on the rod 54 by means of two nuts 58, 58. The pin projects through suitable openings formed in a flanged portion of the nut 55. A source of fluid pressure is connected to the lower part of the cylinder 51 by means of a pipe 59 with a valve 60. Suitable packing 61 is provided between the piston 52 and the rod 54, and similar packing 62 is provided in the base 50 for the rod 54. Thus the rod is free for movement relative to the piston 52 and the cylinder 53 when the power feeding mechanism (to be hereinafter described) is in operation. Upon operating the valve 60 and admitting air to the cylinder 51, the ram 4 is rapidly lowered to place the cutting tools in operative relation with respect to the work. The valve 60 is operated by a lever 63 which is connected by a link 64 to an arm 65 on the control lever 34. (Fig. 1.) Thus the rapid traverse mechanism is controlled by the control lever 34 which governs the operation of the work carrying table.

A relatively slow power feed mechanism is provided for feeding the cutting tools through the work. (Figs. 1, 2, 3 and 4.) This power feed mechanism comprises a shaft 67 mounted on the upright 2, with a pinion 68 and a gear 69 mounted thereon. The pinion 68 meshes with the rack 43 on the ram 4. The gear 69 meshes with a pinion 70 on a shaft 71 that carries a worm wheel 72 which is adapted to be engaged by a feed worm 73 on a driving shaft 74. The worm wheel 72 is yieldingly connected to the shaft 71 in such manner as to permit the operation of the rapid traverse mechanism even when the relatively slow power feed mechanism is in operation by virtue of engagement of the driving worm 73 with the worm wheel 72.

Referring to Figs. 2 and 6 of the drawings, it will be noted that the worm wheel 72 is rotatably mounted on the shaft 71, and that a plate 76 is also mounted fast on said shaft 71 in a lateral recess in the worm wheel 72. The plate 76 is secured to the shaft 71 by set screws and carries two pawls 77 which are adapted to engage ratchet teeth 78 formed on the inside of the worm wheel 72.
The ratchet teeth 78 are shaped to permit free rotation of the plate 76 with the shaft 71 when the latter is rotated counterclockwise (Fig. 2) at a rapid rate by the traverse mechanism including the gear 44, but to be engaged by the pawls 77 and thus slowly rotate the shaft 71 counterclockwise when the worm wheel 72 is being driven by engagement with the worm 73, for the purpose of slowly feeding the tools through the work.
I. e., upon operation of worm wheel 72 counterclockwise at a faster rate than the shaft 71, the pawls 77 will engage the ratchet teeth 78 to rotate the shaft 71 counterclockwise. The shaft 74, which carries the worm 73, is connected to a drive shaft 80 by means of a suitable universal joint in order to permit the raising and lowering of worm 73 for connecting and disconnecting it to and from the worm wheel 72 as above mentioned. The shaft 80 is driven from any suitable source of power (not shown) through a gear 81 on said shaft.

The end of the shaft 74 that carries the worm 75 is supported by a bracket 82 which is movably mounted on the head 5. A cam member 83, which is carried by a cam shaft 84, is provided for raising and lowering the bracket 82 to control the engagement of the worm 73 with the worm wheel 72. The cam member 83 is rotatably mounted on the shaft 84 and is connected to it by means of a spring 85. As shown in Figs. 4 and 7, one end of the spring 85 is connected to the cam 83 and the other end to a collar 86 secured to the shaft 84. Thus upon rotation of the cam shaft 84 to raise the bracket 82, the spring 85 will give in case the worm 73 does not immediately mesh with the teeth on the worm wheel 72, but will move the worm into mesh with the worm wheel as soon as the teeth on the worm and on the worm wheel are in proper relation to each other. The shaft 84 is mounted in bearings 87 on the lower side of the head 5 and carries a combined cam and latch member or device 88ª (Figs. 1, 4 and 8) and a hand lever 120. The cam and latch device 88ª comprises a cam 88 and a latch 89, which operate as hereinafter set forth to actuate the feed control cam 83.
For this purpose, there is a link 90 connected to the bell crank lever 31 at one end (Fig. 1), and supported by a bracket 91 on the machine upright 2. At its other end this link 90 (Figs. 1 and 8) has a hook or latch 92 which is adapted to engage a similar hook on a latch lever 93. The latch lever 93 is pivotally supported on the upright 2 by means of a bolt 94 which also secures a bracket 95 in position. A spring 96 is provided for engaging one end of the latch lever 93 to exert a force tending to hold it in engagement with the cam 88 and to hold the latch portion of the lever in position to be engaged by the hook 92 on the link 90.
When the rod 90 is pushed to the left (Figs. 1 and 8) by the movement of the controller 34 counterclockwise, the latch lever 93 eventually engages it at 92 and holds it there (in the position shown in Fig. 8), until it is subsequently released as hereinafter described.

A "dog" lever 98 is pivotally connected to an arm 97 on the link 90; it is supported by the bracket 95 and is adapted to engage a shoulder 99 of the cam 88 for the purpose of operating the cam and latch device 88ª. A spring 100 is provided for holding the lever 98 in raised position, and also a spring 101 for exerting a force on the cam and latch device 88ª to turn it counterclockwise (Fig. 8). As will be understood from Figs. 4 and 8, the latch 89 is in a plane in front of the shoulder 99 which engages the "dog" lever 98. In front of the levers 93 and 98 is a trip lever 102 pivoted on the upright 2 by means of a bolt 103. It has a latch shoulder 104 for engaging the latch 89, and is pivotally connected to a trip rod 106 mounted in brackets 107 on the head 5 of the machine frame.

When the rod 90 is pushed to the left to latch it with the lever 93, it pushes the lever 98 in that direction, and the end of the lever 98 engages the shoulder 89 of the cam 88 and rotates the latter clockwise far enough to allow the lever 102 to engage the cam shoulder 89 and latch the cam in the position shown in Fig. 8. This rotation of the cam 88 carries its portion 99ª down from beneath the lever 93, so as to allow the latter to latch with the rod 90 as already described. The descending cam portion 99ª also depresses the end of the lever 98 out of engagement with the cam shoulder 99. The rotation of the cam device 88ª by the dog lever 98 rotates the shaft 84 and its cam 83, thereby raising the power-driven worm 73 into engagement with the worm wheel 72. The resultant operation of the shaft 71, etc., feeds the ram 4 slowly downward for its working cuts.

A spring 108 is mounted on the trip rod 106 between one of the brackets 107 and a collar 109 fastened on the rod, and tends to hold the rod 106 and the lever 102 in elevated position. On the ram 104 is an adjustable stop 109ª for engaging and pushing down the rod 106 at the end of the boring operation, for a purpose to be described hereinafter. Preferably, projections 110 carrying springs 111 are provided for limiting and cushioning the downward movement of the ram 4.

Upon the movement of the control lever 34 in a forward direction,—counterclockwise or towards the left, as shown in Fig. 1,—the brake 30 is released and the clutch 32 is closed to connect the source of power to the power shaft 28. The cam plate 17 is rotated by means of the bevelled pinion 29 and the bevelled teeth 20 and the bolts 15 are actuated by the cam slots 18 to move the clamping jaws 10 radially into engagement with the work. The wheel 27 which is connected to the work table 3 through the pinion 25 has sufficient inertia to prevent rotation of the work table until the car wheel or work piece has been centered and clamped in position. When the clamping jaws 10 have firmly engaged the work, the table is rotated through the cam plate 17 and the bolts 15.

The forward movement of the control lever 34 operates the fluid valve 60 by means of the link 64 and the lever 63. Fluid pressure is admitted to the cylinder 51 and the plunger 52 is quickly raised, so as to effect a rapid downward traverse or movement of the ram, the cylinder 53 engaging the nut 55 and raising the weight 48. As already intimated, the weight 48 can be further raised by the mechanical feeding downward of the ram 4 after the plunger 52 has reached the end of its stroke in the cylinder 51, owing to the freedom of the rod 54 for movement upward through the plunger.

Upon the movement of the bell crank lever 31 in a forward direction (counterclockwise in Fig. 1) by the control lever 34, the link 90 is moved towards the left, as viwed in Fig. 1 and Fig. 8, latching at 92 with the lever 93. Such latching engagement between the link 90 and the lever 93 holds the control lever 34 in the forward position until the completion of the boring operation. The lever 98, which is pivotally connected to the arm 97 on the link 90, engages the shoulder 99 on the cam 88 and rotates such cam to permit latching engagement between the lever 93 and the link 90 and between the latch 89 and the trip lever 102. After a movement of the lever 98 toward the left sufficient to permit the above latching operations, the projection 99ª on the cam 88 engages the top of the lever 98 and forces the end of the lever below the projection 99 on the cam 88. The latch 89 is in position to engage the latch portion 104 of the lever 102 when the end of the lever 98 is disengaged from the latch 89, the latch 89 being rotated somewhat beyond the latch portion 104 by the lever 98. The spring member 101 holds the latch 89 in engagement with the latch portion 104 on the trip lever 102. The cam 88, which is mounted on the shaft 84, effects rotation of such shaft and the cam 83 for meshing the worm 73 with the worm gear 72. In Fig. 8 of the drawing the end of the lever 98 is shown in position below the projection 99 on the cam 88 when the lever 34 is in its forward position. In Fig. 1 of the drawings the lever 98 is shown in the extreme position toward the right and with the end thereof in position to engage the projection 99 on the cam 88.

Upon raising of the weight 48 by the rapid traverse mechanism, the ram 4 is rapidly lowered until the cutting tools engage the work. At such time the pawl members 77 engage the ratchet teeth 78 on the worm wheel 72 for driving the shaft 71 by means of the relatively slow power feeding mechanism. The ram 4 is then slowly fed downwardly until the various cutting tools 7, 8 and 9 have passed through or acted on the work piece. At such time the stop member 109 engages the trip rod 106. The downward movement of the trip rod 106 moves the trip lever 102 out of engagement with the latch 89. The cam 88 is then turned counterclockwise (Fig. 8) by the spring 101, raising the lever 93 and unlatching such lever from the link 90. The unlatching of the lever 93 from the link 90 permits the control lever 34 to be moved clockwise towards the right, as shown in Fig. 1 of the drawings, by the weight 40. The movement of the control lever 34 towards the right is effected not only by the weight 40 but also by a spring member 115. The spring member 115 is positioned within a tube 116 which is pivotally connected to the arm 65 of the control lever 34. A rod 117 projects into the tube 116 and is provided with a collar 118 for engaging one end of the spring 115. The other end of the spring 115 engages a cap secured to the top of the tube 116. The upper portion of the rod 117 is connected to the gear 44 by a pin and slot connection as shown in Fig. 1 of the drawings. During a boring operation the spring 115 is compressed so that upon unlatching of the link 90 from the lever 93 a force is exerted on the control lever 34 for moving it towards the right (Fig. 1). The counter-clockwise rotation of the cam 88 by the spring 101 permitted by the concurrent unlatching of the lever 102 (Fig. 8), operates the shaft 84 and the cam member 83 to lower the worm 73 away from the worm wheel 72 and thus stop the power feed mechanism.

The backward movement of the control lever 34 operates the bell crank lever 31 to set the brake 30 and to release the clutch 32. Such operation of the clutch 32 and the brake 30 stops the rotation of the ring 19 and the plate 17. However, the table 3 continues to rotate for a limited time by reason of the momentum of the wheel or weight 27. The continued movement of the table 3 serves to unclamp the work from the table by reason of the action of the cam slots 18 on the bolts 15.

The rod 64 acting through the lever 63 closes the valve 60 to disconnect the cylinder 51 from the source of fluid pressure 59. The valve 60, which is provided with a third port or opening, permits the exhausting of the fluid pressure from the cylinder 51 therethrough. The fluid pressure contained in the cylinder 51, which may be exhausted at any desired rate, acts as a cushion during the lowering of the weight 48.

The hand lever 120 which is connected to the shaft 84 serves as a means for releasing the above mechanisms at any time during a boring operation and also for controlling the operation of the relatively slow power feeding mechanism at will.

It is to be understood that the invention is not limited to the exact details of construction shown and described, as it is obvious that various modifications thereof within the scope of the claims will occur to persons skilled in the art.

What is claimed is:

1. In a machine of the character described, the combination with a rotary work table of means for automatically centering and securing the work thereon, including means rotatable relatively to the table; means for driving the table through said last-mentioned means; and separate rotatable inertia means geared to the table; so that said securing means shall be automatically clutched and unclutched by the lag of the table in starting and stopping that is assured by said inertia means.

2. In a car-wheel boring machine, a rotatable work table, movable clutch jaws on said table for engaging the car wheel, a cam plate mounted to have a limited free rotative movement with respect to the table, connecting means between said jaws and the plate for clamping and for releasing the jaws according to the direction of relative movement of the plate with respect to the table and for connecting the plate to the table, and a rotatable weight geared to the table for producing a lag in the rotation of the table upon starting the plate to rotate and for moving the table with respect to the plate upon stopping the rotation of the plate.

3. In a car-wheel boring machine, a rotatable work table, movable clutch jaws on said table for engaging the car wheel, a cam plate mounted on said table to have a limited rotative movement with respect to it, a power shaft having a geared connection to said plate, connecting means between said clutch jaws and the plate for operating the jaws to center and clamp the wheel to the table when the plate is given a rotative movement in one direction with respect to the table and for releasing the jaws from the wheel when relative movement of the plate with respect to the table is effected in an opposite direction, and inertia means comprising a rotatable weight member geared to said table for effecting a lag between the starting of the rotation of the table and the rotation of the plate by the power shaft to operate said clutch jaws and for rotating the table ahead of the plate to release said clutch jaws when the plate is stopped by stopping the power shaft.

4. In a machine of the character described, the combination with a rotary work table having a depending flange and convergently and divergently movable jaws thereon with studs extending down through the table; of means for automatically clamping and unclamping said jaws when the table is started and stopped, including a geared ring detachably secured to the table flange and extending inward therefrom, a separate flywheel geared to said ring, a cam for actuating said studs beneath the table, resting on said ring, and means for driving the table through said cam.

5. In a machine of the character described, the combination with a rotary work support having automatic clamping means and a tool ram movable up and down relative to the support and counterbalanced to rise, of a rapid traverse feed and a working feed for said tool ram, including a connection yielding to permit movement of the ram by the rapid traverse feed while the working feed is in operation; a common controller for the rotary support and said feeds; a trip latch for holding said controller in "on" position; a throw-out device for said controller actuated by the tool ram; and means controlled by the down stroke of the ram for tripping said controller latch and causing return of the tool ram, as well as stopping of the working feed and of the rotary support.

6. In a machine of the character described, the combination with a rotary work support and a tool ram movable up and down relative to the support and counterbalanced to rise, of a rapid traverse feed and a working feed for said tool ram, including a connection yielding to permit movement of the ram by the rapid traverse feed while the working feed is in operation; a common controller for the rotary support and said feeds; a trip latch for holding said controller in "on" position; a throwout device for said controller actuated by the tool ram; and means controlled by the down stroke of the ram for tripping said controller latch and causing return of the tool ram, as well as stopping of the working feed.

7. In a machine of the character described, the combination with a rotary work support having automatic clamping means and a tool ram movable up and down relative to the support, of a rapid traverse feed and a working feed for said tool ram, including a connection yielding to permit a movement of the ram by the rapid traverse feed while the working feed is in operation; a common controller for the rotary support and said feeds; and means controlled by the down stroke of the ram for returning the controller from "on" to "off" position and causing return of the tool ram, as well as stopping of the working feed and of the rotary support.

8. In a machine of the character described, the combination with a rotary work support having automatic clamping means and a tool ram movable up and down relative to the support, of a rapid traverse feed and a working feed for said tool ram; a common controller for the rotary support and said feeds; and means controlled by the down stroke of the ram for returning the controller from "on" to "off" position and causing return of the tool ram, as well as stopping of the working feed and of the rotary support.

9. In a machine of the character described, the combination with a rotary work support and a tool ram movable up and down relative to the support, of a rapid traverse feed and a working feed for said tool ram; a common controller for the rotary support and said feeds; and means controlled by the down stroke of the ram for returning the controller from "on" to "off" position and causing return of the tool ram, as well as stopping of the working feed and of the rotary support.

10. In a machine of the character described, the combination with a rotary work support having automatic clamping means and a tool ram movable up and down relative to the support, of feeding means for said tool ram; a common controller for the rotary support and said feeding means; and means controlled by the down stroke of the ram for causing return of the tool ram, as well as stopping of the feed and of the rotary support.

11. In a boring machine, a rotatable work table, a tool carrying ram, a control lever, and automatic mechanism operated upon a single movement of the control lever for clamping and unclamping the work to the table, for starting and stopping the rotation of the work table, for rapidly traversing the tool into engagement with the work and relatively slowly feeding the tool through the work, and for withdrawing the tool from the work.

12. In a car-wheel boring machine, a rotatable work table, a tool carrying ram, a rapid traverse mechanism and a relatively slow power feed mechanism for said ram, a lever for controlling the rotation of said table, and automatic means controlled by said lever for operating said traverse mechanism and the power feed mechanism.

13. In a car-wheel boring machine, a rotatable table, a tool carrying ram, a fluid-operated rapid traverse mechanism and a relatively slow power feed mechanism for said ram, a lever for controlling the rotation of said table, mechanism operated by said lever upon starting the rotation of the table for operating the slow feed mechanism and the rapid traverse mechanism, means included in the slow feed mechanism for permitting the rapid movement of the ram till the tools engage the wheel to be bored and then for effecting movement of the ram by the slow feed mechanism.

14. In a car-wheel boring machine, a rotatable work table, a tool carrying ram, clamping jaws for centering and for securing the work to the table, rapid traverse mechanism for moving the ram, power feeding mechanism, a control lever, and means automatically operated by a single movement of said lever for operating said clamping jaws to center and clamp the wheel to the table prior to a boring operation and to release the jaws after a boring operation, for operating said traverse mechanism to move the tools on the ram into engagement with the work, for operating said feeding mechanism to feed the tools through the wheel, for returning the ram to initial position and for starting and stopping the rotation of the table.

15. In a car-wheel boring machine, a rotatable table, a tool carrying ram, a rapid traverse mechanism and a relatively slow power feed mechanism for said ram, a lever for controlling the rotation of said table, mechanism operated by the movement of said lever when starting the table rotation for operating the traverse mechanism to engage the tools with the work and for operating said feed mechanism to feed the tools through the work, and means operated in accordance with the movement of the ram and upon completion of the boring operation for releasing the power traverse mechanism and the slow-feed mechanism to permit the return of the ram to initial position and for operating said lever to stop the rotation of the table.

16. In a car-wheel boring machine, a tool carrying ram, a weight for acting in opposition to the force of gravity on the ram, a rod connected to said weight, a fluid device comprising a plunger operating in a fluid cylinder, said rod projecting through said plunger and movable relatively thereto, and an adjustable stop on said rod to be engaged by the plunger for raising said weight.

In witness whereof I have hereunto set my hand.

THEODORE C. KASEBERG.